US009505401B2

(12) United States Patent
Akiyama et al.

(10) Patent No.: US 9,505,401 B2
(45) Date of Patent: Nov. 29, 2016

(54) DRIVING SUPPORT APPARATUS AND DRIVING SUPPORT METHOD

(75) Inventors: Tomonori Akiyama, Susono (JP); Shinji Igarashi, Susono (JP); Yuki Yoshihama, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/877,114

(22) PCT Filed: Sep. 28, 2011

(86) PCT No.: PCT/JP2011/072254
§ 371 (c)(1),
(2), (4) Date: Mar. 29, 2013

(87) PCT Pub. No.: WO2012/043665
PCT Pub. Date: Apr. 5, 2012

(65) Prior Publication Data
US 2013/0226409 A1    Aug. 29, 2013

(30) Foreign Application Priority Data
Oct. 1, 2010  (JP) ................................. 2010-224157

(51) Int. Cl.
*B60W 30/02*  (2012.01)
*B60W 10/20*  (2006.01)
*B60W 10/184*  (2012.01)
(Continued)

(52) U.S. Cl.
CPC ............ *B60W 30/02* (2013.01); *B60W 10/184* (2013.01); *B60W 10/20* (2013.01); *B60W 30/12* (2013.01); *B62D 6/003* (2013.01); *B62D 15/025* (2013.01);
(Continued)

(58) Field of Classification Search
USPC ........................................................ 701/41
See application file for complete search history.

(56) References Cited

U.S. PATENT DOCUMENTS 5,869,753 A * 2/1999 Asanuma ............... B62D 7/159
701/72
6,488,109 B1   12/2002 Igaki et al.
(Continued)

FOREIGN PATENT DOCUMENTS

JP   05-050930 A   3/1993
JP   06-032242 A   2/1994
(Continued)

OTHER PUBLICATIONS

Translation of JP 6-32242 A.*
(Continued)

*Primary Examiner* — Jean-Paul Cass
(74) *Attorney, Agent, or Firm* — Andrews Kurth Kenyon LLP

(57) ABSTRACT

Disclosed is a driving support apparatus for setting a traveling lane in which a vehicle can travel on the basis of a road marking to indicate a lane boundary or a traveling-prohibited region and performing support by combining steering of the vehicle and deceleration of the vehicle so that the vehicle is allowed to travel in the traveling lane if the vehicle is to be departed from the traveling lane, wherein the steering of the vehicle and the deceleration of the vehicle, which are to be performed when the support is performed so that the vehicle is allowed to travel in the traveling lane, are individually controlled depending on a difference $\Delta Y$ between a target yaw rate Ytrg and an actual yaw rate Yrea if the actual yaw rate Yrea is smaller than the target yaw rate Ytrg in order not to allow the vehicle to exceed the traveling lane.

4 Claims, 9 Drawing Sheets

(51) Int. Cl.
*B60W 30/12* (2006.01)
*B62D 6/00* (2006.01)
*B62D 15/02* (2006.01)

(52) U.S. Cl.
CPC ...... *B60W 2520/14* (2013.01); *B60W 2720/14* (2013.01)

(56) References Cited

U.S. PATENT DOCUMENTS

| | | | | |
|---|---|---|---|---|
| 6,929,086 | B1* | 8/2005 | Husain | B62D 5/003 180/402 |
| 8,224,526 | B2* | 7/2012 | Miyajima | B60T 8/1755 340/441 |
| 8,326,496 | B2* | 12/2012 | Yasutake | B60T 8/1755 701/41 |
| 8,718,872 | B2* | 5/2014 | Hirao | B60G 17/08 701/38 |
| 2002/0041229 | A1 | 4/2002 | Satoh et al. | |
| 2003/0116373 | A1* | 6/2003 | Miller | B60T 7/22 180/167 |
| 2004/0193374 | A1* | 9/2004 | Hac | B60K 31/0008 701/301 |
| 2008/0243339 | A1* | 10/2008 | Nishimori | B60G 7/003 701/41 |
| 2010/0023180 | A1* | 1/2010 | Huang | B60W 30/12 701/1 |
| 2010/0023182 | A1* | 1/2010 | Huang | B60W 30/12 701/1 |
| 2010/0023216 | A1* | 1/2010 | Huang | B62D 6/007 701/42 |
| 2010/0023296 | A1* | 1/2010 | Huang | B60W 40/09 702/141 |
| 2010/0106374 | A1* | 4/2010 | Miyajima | B60T 8/1755 701/41 |
| 2010/0109881 | A1* | 5/2010 | Eskandarian | A61B 5/6887 340/575 |
| 2010/0191423 | A1* | 7/2010 | Koyama | B60W 30/09 701/42 |
| 2010/0209884 | A1* | 8/2010 | Lin | G09B 19/167 434/65 |
| 2010/0209885 | A1* | 8/2010 | Chin | G09B 19/167 434/65 |
| 2010/0209886 | A1* | 8/2010 | Lin | G09B 19/167 434/65 |
| 2010/0211270 | A1* | 8/2010 | Chin | B62D 6/007 701/44 |
| 2010/0211271 | A1* | 8/2010 | Yasutake | B60T 8/1755 701/48 |
| 2010/0228444 | A1* | 9/2010 | Kojo | B60T 8/1755 701/42 |
| 2010/0292888 | A1* | 11/2010 | Taguchi | B60W 10/06 701/31.4 |

FOREIGN PATENT DOCUMENTS

| | | |
|---|---|---|
| JP | 2001-114081 A | 4/2001 |
| JP | 2002-079895 A | 3/2002 |
| JP | 2009-035214 A | 2/2009 |
| JP | 2009035214 A * | 2/2009 |
| JP | 2010-184657 A | 8/2010 |

OTHER PUBLICATIONS

Translation of JP 2009-035214A.*

* cited by examiner

| ΔY SMALL | ECB→OFF<br>EPS→ON |
|---|---|
| ΔY MIDDLE | EPS→ON<br>ECB→ON<br>SIMULTANEOUSLY |
| ΔY LARGE | EPS→ON<br>ECB→ON<br>ECB FIRST OUT |

Fig.4

| | |
|---|---|
| ΔG SMALL | ECB→OFF<br>EPS→ON |
| ΔG MIDDLE | EPS→ON<br>ECB→ON<br>SIMULTANEOUSLY |
| ΔG LARGE | EPS→ON<br>ECB→ON<br>ECB FIRST OUT |

Fig.6

| YAW ANGLE θ SMALL | ECB→OFF<br>EPS→ON |
|---|---|
| YAW ANGLE θ MIDDLE | EPS→ON<br>ECB→ON<br>SIMULTANEOUSLY |
| YAW ANGLE θ LARGE | EPS→ON<br>ECB→ON<br>ECB FIRST OUT |

Fig.8

DRIVING SUPPORT APPARATUS AND DRIVING SUPPORT METHOD

This is a 371 national phase application of PCT/JP2011/072254 filed 28 Sep. 2011, which claims priority to Japanese Patent Application No. 2010-224157 filed 1 Oct. 2010, the contents of which are incorporated herein by reference.

TECHNICAL FIELD

The present invention relates to a driving support apparatus and a driving support method.

BACKGROUND ART

A technique has been disclosed, wherein a center of two white lines on a road as road markings to indicate lane boundaries is used as a fixation point, a yaw rate, which is required to allow a vehicle to arrive at the fixation point, is calculated, it is determined that the vehicle may possibly depart or deviate from the lane if a difference between the required yaw rate and an actual or real yaw rate exceeds a threshold value, and thus the vehicle is subjected to the braking (vehicle is decelerated) (see, for example, Patent Document 1). According to the technique described in Patent Document 1, the lane departure can be precisely detected, and the vehicle can be decelerated when the lane departure is caused.

CITATION LIST

Patent Literature

PTL 1: Japanese Patent Application Laid-Open 2002-079895A;
PTL 2: Japanese Patent Application Laid-Open 2001-114081A.

SUMMARY OF INVENTION

Technical Problem

In the case of the driving support apparatus which assistively performs the deceleration of the vehicle so that the vehicle is allowed to travel in a traveling lane (driving lane or driving track) as disclosed in the foregoing technique of Patent Document 1 as well, such a situation sometimes arises that the deceleration of the vehicle, which is intrinsically unnecessary, is performed in a circumstance in which the departure or deviation from the traveling lane can be sufficiently avoided by means of, for example, only the steering of the vehicle. In view of the above, a driving support apparatus may be conceived, wherein the help or support (assistance) is performed by means of the steering of the vehicle so that the vehicle is allowed to travel in the traveling lane. However, for example, when the entering velocity to enter the traveling lane boundary is fast, if the assistance (help or support) is performed by means of only the steering of the vehicle, then an extremely large yaw rate or lateral acceleration arises in some cases, and there is such a possibility that the vehicle may become unstable and/or the driver cannot override the operation. As described above, in the driving support apparatus in which the support is performed so that the vehicle is allowed to travel in the traveling lane, the vehicle cannot be allowed to travel stably in some cases if the support is performed while the means is limited to any one of the steering of the vehicle and the deceleration of the vehicle.

An object of the present invention is to provide a technique in relation to a driving support apparatus which performs the support so that a vehicle is allowed to travel in a traveling lane, wherein the steering of the vehicle and the deceleration of the vehicle are intended to be harmonized and the vehicle is allowed to travel stably.

Solutions to Problem

The present invention adopts the following construction. That is, the present invention resides in a driving support apparatus for setting a traveling lane in which a vehicle can travel on the basis of a road marking to indicate a lane boundary or a traveling-prohibited region and performing support by combining steering of the vehicle and deceleration of the vehicle so that the vehicle is allowed to travel in the traveling lane if the vehicle is to be departed from the traveling lane, wherein:

the steering of the vehicle and the deceleration of the vehicle, which are to be performed when the support is performed so that the vehicle is allowed to travel in the traveling lane, are individually controlled depending on a difference between a target value and an actual value if the actual value is smaller than the target value of a parameter which indicates lateral movement in order to avoid departure of the vehicle from the traveling lane or depending on a yaw angle between the vehicle and a boundary of the traveling lane.

According to the present invention, it is possible to harmonize the steering of the vehicle and the deceleration of the vehicle when the support is performed so that the vehicle is allowed to travel in the traveling lane (driving lane or driving track), and it is possible to allow the vehicle to travel stably.

In this context, the parameter, which indicates the lateral movement, is, for example, the yaw rate and the lateral acceleration. The case in which the actual value (real value) is smaller than the target value of the parameter to indicate the lateral movement, i.e., the case in which, for example, the actual yaw rate (real yaw rate) or the actual lateral acceleration (real lateral acceleration) is smaller than, for example, the target yaw rate or the target lateral acceleration is such a case that, for example, the actual yaw rate or the actual lateral acceleration is smaller than the required amount and the departure of the vehicle from the traveling lane cannot be avoided even when the driver drives or operates the vehicle as it is. The road marking (road indication), which indicates the lane boundary, is exemplified, for example, by the median strip and the partition between lanes including, for example, lines such as white lines, yellow lines, dotted lines and the like, road studs, and light emitting objects on the road surface, and the boundary between the roadway and those other than the roadway including, for example, boundaries between asphalt and gravel. The traveling-prohibited region is exemplified by the obstacle including, for example, side walls, curbstone, walkers, bicycles, and other vehicles, and the region or area in which any difference in height is present with respect to the traveling flat surface for allowing the vehicle to travel, including, for example, gutters and steps. The traveling-prohibited region includes the region in which it is intended not to allow the vehicle to travel and the region in which the traveling of the vehicle is not preferred, in addition to the region in which the vehicle cannot travel.

When the support is performed so that the vehicle is allowed to travel in the traveling lane, it is preferable to select any one of execution of only the steering of the vehicle without performing the deceleration of the vehicle, simultaneous execution of the steering of the vehicle and the deceleration of the vehicle, and execution of the steering of the vehicle after previously decelerating the vehicle.

According to the present invention, the support (help or) can be performed in conformity with the yaw angle or the difference between the target value and the actual value provided when the actual value is smaller than the target value of the parameter which indicates the lateral movement. It is possible to harmonize the steering of the vehicle and the deceleration of the vehicle when the support is performed so that the vehicle is allowed to travel in the traveling lane. It is possible to allow the vehicle to travel stably.

It is preferable that only the steering of the vehicle is performed without performing the deceleration of the vehicle when the support is performed so that the vehicle is allowed to travel in the traveling lane if the difference between the target value and the actual value is smaller than a first threshold value if the actual value is smaller than the target value of the parameter which indicates the lateral movement in order not to allow the vehicle to exceed the traveling lane;

the steering of the vehicle and the deceleration of the vehicle are performed simultaneously if the difference is not less than the first threshold value and smaller than a second threshold value if the actual value is smaller than the target value of the parameter which indicates the lateral movement in order not to allow the vehicle to exceed the traveling lane; or the steering of the vehicle is performed after previously decelerating the vehicle if the difference is not less than the second threshold value if the actual value is smaller than the target value of the parameter which indicates the lateral movement in order not to allow the vehicle to exceed the traveling lane.

Further, it is preferable that only the steering of the vehicle is performed without performing the deceleration of the vehicle when the support is performed so that the vehicle is allowed to travel in the traveling lane if the yaw angle between the vehicle and the boundary of the traveling lane is smaller than a third threshold value;

the steering of the vehicle and the deceleration of the vehicle are performed simultaneously if the yaw angle between the vehicle and the boundary of the traveling lane is not less than the third threshold value and smaller than a fourth threshold value; or the steering of the vehicle is performed after previously decelerating the vehicle if the yaw angle between the vehicle and the boundary of the traveling lane is not less than the fourth threshold value.

According to the present invention, it is possible to perform the support in the three ways by classifying, into the three stages or levels, the magnitude of the yaw angle and the difference if the actual value is smaller than the target value of the parameter which indicates the lateral movement. It is possible to harmonize the steering of the vehicle and the deceleration of the vehicle when the support is performed so that the vehicle is allowed to travel in the traveling lane. It is possible to allow the vehicle to travel stably.

Further, the present invention resides in a driving support method comprising:

a step of setting a traveling lane in which a vehicle can travel on the basis of a road marking to indicate a lane boundary or a traveling-prohibited region;

a step of performing support by combining steering of the vehicle and deceleration of the vehicle so that the vehicle is allowed to travel in the traveling lane if the vehicle is to be departed from the traveling lane; and a step of individually controlling the steering of the vehicle and the deceleration of the vehicle which are to be performed when the support is performed so that the vehicle is allowed to travel in the traveling lane depending on a difference between a target value and an actual value if the actual value is smaller than the target value of a parameter which indicates lateral movement in order to avoid departure of the vehicle from the traveling lane or depending on a yaw angle between the vehicle and a boundary of the traveling lane.

According to the present invention, it is also possible to harmonize the steering of the vehicle and the deceleration of the vehicle when the support is performed so that the vehicle is allowed to travel in the traveling lane. It is also possible to allow the vehicle to travel stably.

Advantageous Effects of Invention

According to the present invention, it is possible to harmonize the steering of the vehicle and the deceleration of the vehicle, and it is possible to allow the vehicle to travel stably, in relation to the driving support apparatus which performs the support so that the vehicle is allowed to travel in the traveling lane.

BRIEF DESCRIPTION OF DRAWINGS

FIG. 4 shows the control to be performed corresponding to the difference obtained by subtracting the actual yaw rate from the target yaw rate in relation to the driving support apparatus according to the first embodiment.

FIG. 6 shows the control to be performed corresponding to the difference obtained by subtracting the actual lateral acceleration from the target lateral acceleration in relation to a driving support apparatus according to a second embodiment.

FIG. 8 shows the control to be performed corresponding to the yaw angle in relation to a driving support apparatus according to a third embodiment.

DESCRIPTION OF EMBODIMENTS

A specified embodiment of the present invention will be explained below. An explanation will now be made about the embodiment in which the present invention is applied to such a driving support apparatus that the traveling lane of a vehicle is set by recognizing the traffic lane and the traveling-prohibited region and the driving support process is performed in order to avoid the departure from the set traveling lane. The driving support process referred to herein is executed earlier than the process in which the vehicle is subjected to the emergency stop and the collision damage mitigating process which is executed when the collision between a vehicle and an obstacle is inevitable. The construction, which is explained in the following embodiment, represents a mode for carrying out the present invention, which does not limit the construction of the present invention.

<First Embodiment>
(Driving Support Apparatus)

Figure 1:
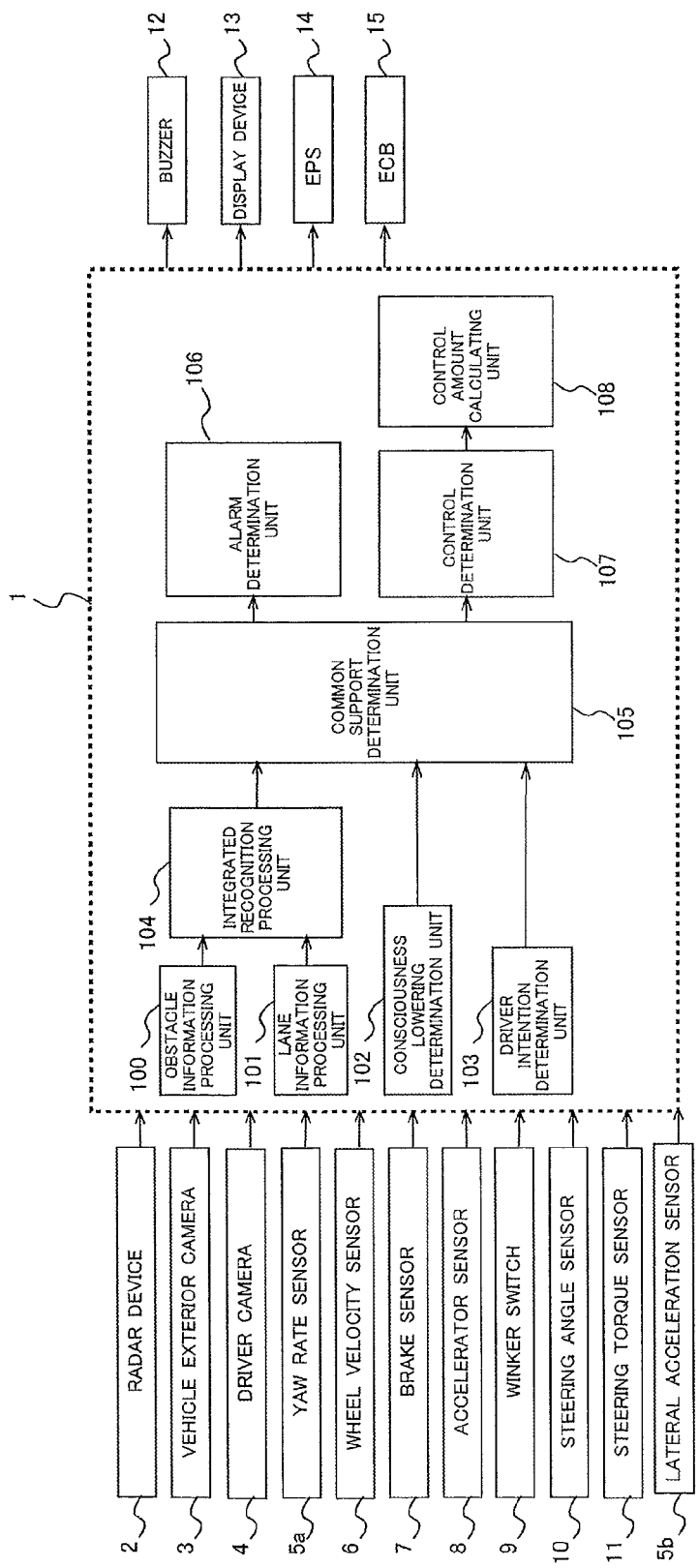
FIG. 1 shows a block diagram illustrating the construction and functions of a driving support apparatus according to a first embodiment of the present invention.

FIG. 1 shows a block diagram illustrating the construction and functions of a driving support apparatus according to a first embodiment of the present invention. As shown in FIG. 1, an electronic control unit (ECU) 1 for supporting the driving is carried on a vehicle.

ECU 1 is the electronic control unit which is provided with, for example, CPU, ROM, RAM, backup RAM, and an I/O interface. Those electrically connected to ECU 1 are various sensors including, for example, a radar device 2, a vehicle exterior camera 3, a driver camera 4, a yaw rate sensor 5a, a lateral acceleration (lateral G) sensor 5b, a wheel velocity sensor 6, a brake sensor 7, an accelerator sensor 8, a winker switch 9, a steering angle sensor 10, and a steering torque sensor 11. Output signals of the sensors are inputted into ECU 1.

The radar device 2 is attached to a front portion of the vehicle, wherein a millimeter wave is transmitted forwardly from the vehicle and the reflected wave, which is reflected by an obstacle disposed outside the vehicle, is received. Accordingly, the radar device 2 outputs the information (for example, coordinate information) in relation to the relative position of the obstacle with respect to the vehicle. The vehicle exterior camera 3 is arranged at a position at which those existing in front of the vehicle can be captured in the field of view in the vehicle cabin, and the vehicle exterior camera 3 outputs an image of those existing in front of the vehicle. The driver camera 4 is arranged at a position at which the driver can be captured in the field of view in the vehicle cabin, and the driver camera 4 outputs an image of the driver. The yaw rate sensor 5a is attached to a vehicle body, and the yaw rate sensor 5a outputs an electric signal correlated with the yaw rate of the vehicle. The lateral acceleration sensor 5b is attached to the vehicle body, and the lateral acceleration sensor 5b outputs an electric signal correlated with the lateral acceleration provided when the vehicle turns. The wheel velocity sensor 6 is attached to a wheel of the vehicle, and this sensor outputs an electric signal correlated with the travel velocity of the vehicle.

The brake sensor 7 is attached to a brake pedal in the vehicle cabin, and the brake sensor 7 outputs an electric signal correlated with the operation torque (pedaling force) of the brake pedal. The accelerator sensor 8 is attached to an accelerator pedal in the vehicle cabin, and the accelerator sensor 8 outputs an electric signal correlated with the operation torque (pedaling force) of the accelerator pedal. The winker switch 9 is attached to a winker lever in the vehicle cabin, and the winker switch 9 outputs an electric signal correlated with the direction indicated by the winker (direction indicator) when the winker lever is operated. The steering angle sensor 10 is attached to a steering rod connected to a steering wheel in the vehicle cabin, and the steering angle sensor 10 outputs an electric signal correlated with the angle of rotation of the steering wheel from the central position. The steering torque sensor 11 is attached to the steering rod, and the steering torque sensor 11 outputs an electric signal correlated with the torque (steering torque) inputted into the steering wheel.

Further, various devices and systems including, for example, a buzzer 12, a display device 13, an electric power steering (EPS) 14, and an electronically controlled brake (ECB) system 15 are connected to ECU 1, and the various devices and systems are electrically controlled by ECU 1.

The buzzer 12 is attached in the vehicle cabin, and this device outputs, for example, a warning sound. The display device 13 is attached in the vehicle cabin, and this device displays various messages and warning lamps. The electric power steering (EPS) 14 is a device which supports the operation of the steering wheel by utilizing the torque generated by an electric motor. The electronically controlled brake (ECB) 15 is a device which electrically adjusts the operating hydraulic pressure (braking hydraulic pressure) of a friction brake provided for each of the wheels.

ECU 1 has the following functions in order to control the various devices and systems by utilizing the output signals of the various sensors described above. That is, ECU 1 is provided with an obstacle information processing unit 100, a lane information processing unit 101, a consciousness lowering determination unit 102, a driver intention determination unit 103, an integrated recognition processing unit 104, a common support determination unit 105, an alarm determination unit 106, a control determination unit 107, and a control amount (controlled variable) calculating unit 108.

The obstacle information processing unit 100 approximately determines a regression straight line on which a plurality of traveling-prohibited regions can be avoided or dodged on the basis of the coordinate information of the traveling-prohibited regions such as a plurality of obstacles or the like outputted from the radar device 2, and the obstacle information processing unit 100 generates the information including, for example, the coordinate information of the regression straight line and the yaw angle of the vehicle with respect to the regression straight line. Further, if the traveling-prohibited region such as a single obstacle or the like is detected by the radar device 2, the obstacle information processing unit 100 also generates the coordinate information of the concerning traveling-prohibited region and the information concerning the yaw angle of the vehicle with respect to the traveling-prohibited region. The obstacle information processing unit 100 may generate the information concerning the traveling-prohibited region on the basis of the image photographed or picked up by the vehicle exterior camera 3. The traveling-prohibited region is exemplified by the obstacle including, for example, side walls, curbstone, walkers, bicycles, and other vehicles, and the region or area in which any difference in height is present with respect to the traveling flat surface for allowing the vehicle to travel, including, for example, gutters and steps. The traveling-prohibited region includes the region in which it is intended not to allow the vehicle to travel and the region in which the traveling of the vehicle is not preferred, in addition to the region in which the vehicle cannot travel.

The lane information processing unit 101 generates the information concerning the lane (traffic lane) and the information concerning the attitude or posture of the vehicle with respect to the lane on the basis of the image picked up by the vehicle exterior camera 3. The information concerning the lane is the information concerning the road marking to indicate the lane boundary and the information concerning the width of the lane prescribed by the concerning road marking. The road marking, which indicates the lane boundary, is exemplified, for example, by the median strip and the partition between lanes including, for example, lines such as white lines, yellow lines, dotted lines and the like, road studs, and light emitting objects on the road surface, and the boundary between the roadway and those other than the roadway including, for example, boundaries between asphalt and gravel. The information concerning the attitude of the vehicle with respect to the lane is the information concerning the distance between the vehicle and the road marking to indicate the lane boundary, the information concerning the offset amount of the vehicle position with respect to central portion of the lane, and the information concerning the yaw angle in the traveling direction of the vehicle with respect to the road marking to indicate the lane boundary. In addition, when the vehicle carries a navigation system, the lane information processing unit 101 may generate the information concerning the lane (traffic lane) from the GPS information and the map information possessed by the navigation system.

The consciousness lowering determination unit 102 determines the degree of lowering of consciousness (degree of awakening) of the driver on the basis of the image photographed or picked up by the driver camera 4. The consciousness lowering determination unit 102 calculates the eye closing time and the eye closing frequency of the driver from the image picked up by the driver camera 4, and it is determined that the consciousness of the driver is lowered or decreased (it is determined that the degree of awakening is low) if the eye closing time or the eye closing frequency exceeds an upper limit value. Alternatively, the consciousness lowering determination unit 102 may calculate the time in which the direction of the face and/or the direction of the line of sight of the driver is/are deviated from the traveling direction of the vehicle, from the image picked up by the driver camera 4 to determine that the driver looks aside if the calculated time exceeds an upper limit value.

The driver intention determination unit 103 determines whether or not the change of the operation amount of the brake pedal, the change of the operation amount of the accelerator pedal, or the change of the operation (steering) amount of the steering wheel is based on the intension of the driver, on the basis of the output signals of the wheel velocity sensor 6, the brake sensor 7, the accelerator sensor 8, the winker switch 9, the steering angle sensor 10, and the steering torque sensor 11.

The integrated recognition processing unit 104 sets the traveling lane (driving lane or driving track) in which the vehicle can travel, on the basis of the information generated by the obstacle information processing unit 100 and the information generated by the lane information processing unit 101 to determine the yaw angle of the vehicle with respect to the traveling lane boundary and the offset amount of the vehicle with respect to the central portion of the traveling lane. In the case of a lane (traffic lane) having a narrow width, the driver inevitably departs the vehicle from the traffic lane in some cases. In relation thereto, as for the traffic lane having the narrow width, the integrated recognition processing unit 104 may set the traveling lane while departing from the road marking, on the basis of the information concerning the road marking to indicate the traffic lane boundary and the information concerning the traveling-prohibited region existing around the traffic lane. In other words, the integrated recognition processing unit 104 may set a temporary traveling lane which deviates or departs from the road marking, on the basis of the road marking which indicates the traffic lane boundary, and the integrated recognition processing unit 104 may set a regular traveling lane which deviates or departs from the road marking, on the basis of the temporary traveling lane and the traveling-prohibited region. If the integrated recognition processing unit 104 receives the information concerning a single traveling-prohibited region from the obstacle information processing unit 100, the integrated recognition processing unit 104 may elongate the length of the traveling-prohibited region in parallel to the traffic lane, and the integrated recognition processing unit 100 may set the traveling lane on the basis of the elongated traveling-prohibited region. That is, the integrated recognition processing unit 104 may set the traveling lane such that the traveling-prohibited region detected as the point on the coordinate is regarded as the line on the coordinate. The amount of elongation (length of the line), which is provided in this procedure, may be made long if the output signal (vehicle velocity) of the wheel velocity sensor 6 is high and/or if the yaw angle of the vehicle with respect to the line is large, as compared with if the vehicle velocity is low and/or if the yaw angle with respect to the line is small.

The common support determination unit 105 determines whether or not the driving support process is executed on the basis of the information generated by the integrated recognition processing unit 104, the determination result of the consciousness lowering determination unit 102, and the determination result of the driver intention determination unit 103. The common support determination unit 105 permits the execution of the driving support process if it is determined by the consciousness lowering determination unit 102 that the consciousness of the driver is lowered or the driver looks aside. On the other hand, the common support determination unit 105 restricts the execution of the driving support process if it is determined by the driver intention determination unit 103 that the driver performs the intentional operation.

If the execution of the driving support process is permitted by the common support determination unit 105, the alarm determination unit 106 determines the beeping timing of the buzzer 12 and the display timing of the warning message or the warning lamp to be displayed by the display device 13. The alarm determination unit 106 may perform the beeping of the buzzer 12 and/or display of the warning message or the warning lamp to be displayed by the display device 13, if the distance between the vehicle and the traveling lane boundary in the widthwise direction of the vehicle is not more than a preset threshold value, if the distance is zero, or if the vehicle travels beyond (exceeds) the traveling lane boundary. The alarm determination unit 106 not only performs the beeping of the buzzer 12 and the display of the warning message or the warning lamp to be displayed by the display device 13 on the basis of the traveling lane boundary but also performs the following operation. That is, the alarm determination unit 106 may enlarge the beeping of the buzzer 12 and/or the alarm determination unit 106 may enlarge the display of the warning message or the warning lamp to be displayed by the display device 13, in relation to such a direction that the departure from the traveling lane is caused to a greater extent, while grasping the traveling lane boundary more broadly in view of the potential. The alarm determination unit 106 may perform the beeping of the buzzer 12 and/or the display of the warning message or the warning lamp to be displayed by the display device 13, if the time, which is required until the vehicle arrives at the traveling lane boundary in the widthwise direction of the vehicle, is not more than a preset threshold value. When the vehicle enters a curve or when the vehicle travels along a curve, then the alarm determination unit 106 may perform the beeping of the buzzer 12 and/or the display of the warning message or the warning lamp to be displayed by the display device 13, if the distance between the vehicle and the traveling lane boundary in the traveling direction of the vehicle is not more than a preset threshold value, if the distance is zero, or if the vehicle travels beyond the traveling lane boundary. When the vehicle enters a curve or when the vehicle travels along a curve, then the alarm determination unit 106 may perform the beeping of the buzzer 12 and/or the display of the warning message or the warning lamp to be displayed by the display device 13, if the time, which is required until the vehicle arrives at the traveling lane boundary in the traveling direction of the vehicle, is not more than a preset threshold value. The timing, at which the alarm determination unit 106 performs the beeping of the buzzer 12 and/or the display of the warning message or the warning lamp to be displayed by the display device 13, corresponds to the timing (instant or moment) of the departure of the vehicle from the traveling lane.

In this procedure, the threshold values of the distance and the time, which are used by the alarm determination unit 106 to determine whether or not the execution is required to perform the beeping of the buzzer 12 and/or the display of the warning message or the warning lamp to be displayed by the display device 13, are the values which are changed depending on the output signal of the wheel velocity sensor 6 (vehicle velocity) and the output signal of the yaw rate sensor 5 (yaw rate). When the vehicle velocity is high, then the threshold value of the distance is set to be long or the threshold value of the time is set to be long, as compared with when the vehicle velocity is low. When the yaw rate is large, then the threshold value of the distance is set to be long or the threshold value of the time is set to be long, as compared with when the yaw rate is small.

The method for warning the driver is not limited to the beeping of the buzzer 12 and the display of the warning message or the warning lamp to be displayed on the display device 13. It is also allowable to adopt, for example, a method in which the tightening torque of a seat belt is changed intermittently.

If the execution of the driving support process is permitted by the common support determination unit 105, the control determination unit 107 determines whether or not the electric power steering (EPS) 14 and/or the electronically controlled brake (ECB) 15 is/are operated in order to avoid the departure of the vehicle from the traveling lane. The control determination unit 107 may operate the electric power steering (EPS) 14 and/or the electronically controlled brake (ECB) 15 if the distance between the vehicle and the traveling lane boundary in the widthwise direction of the vehicle is not more than a preset threshold value, if the distance is zero, or if the vehicle travels beyond the traveling lane boundary. The control determination unit 107 may operate the electric power steering (EPS) 14 and/or the electronically controlled brake (ECB) 15, if the time, which is required until the vehicle arrives at the traveling lane boundary in the widthwise direction of the vehicle, is not more than a preset threshold value. When the vehicle enters a curve or when the vehicle travels along a curve, then the control determination unit 107 may operate the electric power steering (EPS) 14 and/or the electronically controlled brake (ECB) 15, if the distance between the vehicle and the traveling lane boundary in the traveling direction of the vehicle is not more than a preset threshold value, if the distance is zero, or if the vehicle travels beyond the traveling lane boundary. When the vehicle enters a curve or when the vehicle travels along a curve, then the control determination unit 107 may operate the electric power steering (EPS) 14 and/or the electronically controlled brake (ECB) 15, if the time, which is required until the vehicle arrives at the traveling lane boundary in the traveling direction of the vehicle, is not more than a preset threshold value. The timing, at which the control determination unit 107 operates the electric power steering (EPS) 14 and/or the electronically controlled brake (ECB) 15, corresponds to the timing (instant or moment) of the departure of the vehicle from the traveling lane.

The threshold values of the distance and the time, which are used by the control determination unit 107, are changed depending on the vehicle velocity and the yaw rate in the same manner as the threshold values of the distance and the time used by the alarm determination unit 106. However, the threshold values of the distance and the time, which are used by the control determination unit 107, may be set to be shorter than the threshold values of the distance and the time which are used by the alarm determination unit 106.

If the operation request for operating the electric power steering (EPS) 14 and/or the electronically controlled brake (ECB) 14 is generated by the control determination unit 107, then the control amount calculating unit 108 calculates the control amounts of the electric power steering (EPS) 14 and the electronically controlled brake (ECB) 15, and the control amount calculating unit 108 operates the electric power steering (EPS) 14 and the electronically controlled brake (ECB) 15 in accordance with the calculated control amounts. When the electronically controlled brake (ECB) 15 is operated, if different braking hydraulic pressures are applied to the friction brakes for the left and right wheels of the vehicle, then a yaw rate, which interferes with the yaw rate generated by the electric power steering (EPS) 14, is generated. Therefore, it is desirable that equivalent braking hydraulic pressures are applied to the friction brakes for the left and right wheels. The control amount calculating unit 108 not only operates the electric power steering (EPS) 14 and the electronically controlled brake (ECB) 15 on the basis of the traveling lane boundary but also performs the following operation. That is, the control amount calculating unit 108 may increase the control amounts in relation to such a direction that the departure from the traveling lane is caused to a greater extent, while grasping the traveling lane boundary more broadly in view of the potential. Detailed explanation in relation to the control amount calculating unit 108 will be made later on.

The method for decelerating the vehicle is not limited to the method in which the friction brake is operated by means of the electronically controlled brake (ECB) 15. It is also allowable to use a method in which the kinetic energy of the vehicle is converted (regenerated) into the electric energy and a method in which the transmission gear ratio of a transmission is changed to increase the engine brake.

According to the driving support apparatus described above, it is possible to warn the driver of the departure from the traveling lane which is set on the basis of the traffic lane and the traveling-prohibited region such as the obstacle or the like, and it is possible to support the operation in order to avoid the departure from the traveling lane.

(Control Amount Calculation Control)

Figure 2A:
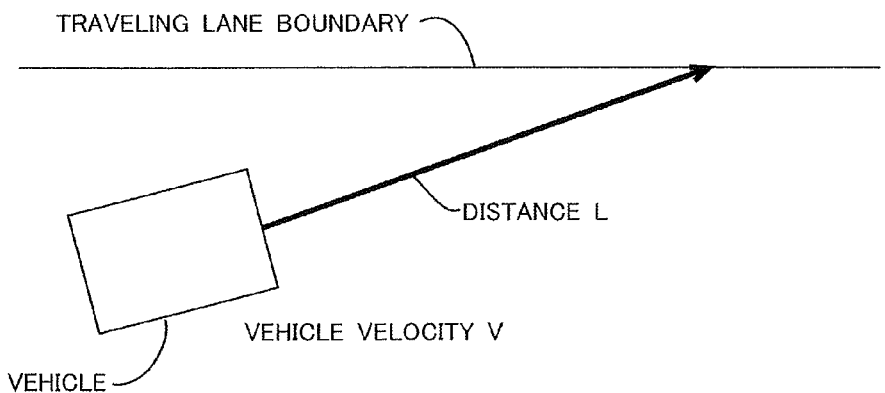
FIGS. 2A and 2B shows situations as assumed when a conventional driving support apparatus performs the support.
Figure 2B:
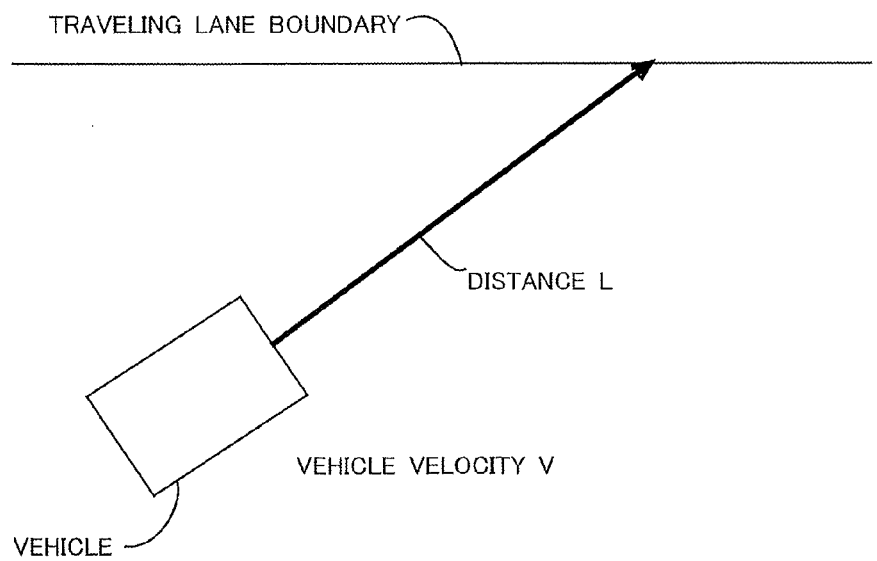

The operation of a conventional driving support apparatus will now be explained as exemplified by situations shown in FIGS. 2A and 2B by way of example. The situation shown in FIG. 2A is such a situation that the vehicle enters the traveling lane boundary at a small angle, and the situation shown in FIG. 2B is such a situation that the vehicle enters the traveling lane boundary at a large angle. With reference to FIGS. 2A and 2B, for example, it is assumed that the distance L provided in the traveling direction of the vehicle from the vehicle to the traveling lane boundary and the allowance time until the departure from the traveling lane as calculated from the vehicle velocity V and the distance L fulfill the condition to execute the support for the driving (for example, the distance L is not more than a threshold value, and the allowance time is not more than a threshold value). In the case of the conventional driving support apparatus, any one of the deceleration of the vehicle and the steering of the vehicle is performed as the support for the driving. Therefore, for example, in the case of any driving support apparatus in which only the deceleration of the vehicle is performed as the support for the driving, the deceleration of the vehicle is executed similarly or equivalently even in the case of any one of the situation shown in FIG. 2A and the situation shown in FIG. 2B. However, in the situation shown in FIG. 2A, when the yaw rate, which is required to avoid the departure from the traveling lane, is small, and the departure from the traveling lane can be avoided by performing only the steering of the vehicle without performing the deceleration of the vehicle as the support for the driving, then it is unnecessary to perform the deceleration of the vehicle as the support for the driving, and it is desirable that the steering of the vehicle is performed as the support for the driving in order to avoid the departure from the traveling lane. However, on the other hand, if the steering of the vehicle is performed as the support for the driving when the entering velocity into the traveling lane boundary is fast in the driving support apparatus which performs only the steering of the vehicle as the support for the driving in order to avoid the departure from the traveling lane, for example, then an extremely large yaw rate or an extremely large lateral acceleration is generated, and there is such a possibility that the vehicle may become unstable and/or the driver cannot override the operation. As described above, in the case of the driving support apparatus in which the support for the driving is performed so that the vehicle travels in the traveling lane, it is not desirable that the support is performed while limiting the support to any one of the steering of the vehicle and the deceleration of the vehicle. It is desirable that the support is changed depending on the situation.

In view of the above, in the driving support apparatus according to this embodiment, if the actual yaw rate is smaller than the target yaw rate in order not to allow the vehicle to travel beyond the traveling lane, the steering of the vehicle and the deceleration of the vehicle, which are to be performed when the support is performed so that the vehicle is allowed to travel in the traveling lane, are individually controlled depending on the difference between the target yaw rate and the actual yaw rate.

An explanation will be made in detail below about the function of the control amount calculating unit 108 according to this embodiment.

If the operation request for operating the electric power steering (EPS) 14 and/or the electronically controlled brake (ECB) 15 is generated by the control determination unit 107, then the control amount calculating unit 108 calculates the control amounts of the electric power steering (EPS) 14 and the electronically controlled brake (ECB) 15, and the control amount calculating unit 108 operates the electric power steering (EPS) 14 and the electronically controlled brake (ECB) 15 in accordance with the calculated control amounts. In this procedure, when the control amounts of the electric power steering (EPS) 14 and the electronically controlled brake (ECB) 15 are calculated, the control amount calculating unit 108 firstly calculates the target yaw rate required to avoid the departure from the traveling lane by using, as the parameters, the information generated by the integrated recognition processing unit 104, the output signal of the wheel velocity sensor 6 (vehicle velocity), and the output signal of the yaw rate sensor 5a (yaw rate).

Figure 3:
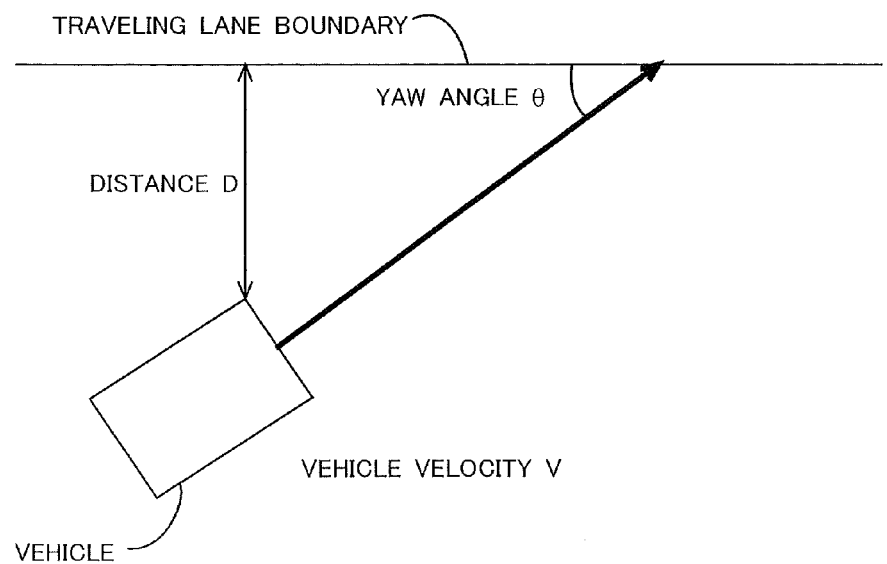
FIG. 3 conceptually shows a situation as assumed to calculate the target yaw rate and the target lateral acceleration.

In particular, as shown in FIG. 3, the control amount calculating unit 108 calculates the target yaw rate Ytrg in accordance with the following expression assuming that D represents the relative distance from the traveling lane boundary, V represents the velocity of the vehicle (vehicle velocity), θ represents the yaw angle of the vehicle with respect to the traveling lane boundary, and T represents the collision allowance time. FIG. 3 conceptually shows a situation as assumed to calculate the target yaw rate.

$T = D/V \sin \theta$ $Ytrg = \theta/T$ $\therefore Ytrg = (\theta \cdot V \sin \theta)/D$ The control amount calculating unit 108 determines the control amount (steering torque) of the electric power steering (EPS) 14 and the control amount (braking hydraulic pressure) of the electronically controlled brake (ECB) 15 by using the target yaw rate Ytrg as the parameter (argument). In this procedure, the control amount calculating unit 108 detects the actual yaw rate Yrea from the yaw rate sensor 5a, and the control amount calculating unit 108 determines whether or not the actual yaw rate Yrea is smaller than the target yaw rate Ytrg. If the actual yaw rate Yrea is larger than the target yaw rate Ytrg, then the driver operates the vehicle to such an extent that the target yaw rate Ytrg is exceeded, and hence the control amount calculating unit 108 determines that the control amount is zero so that the electric power steering (EPS) 14 and the electronically controlled brake (ECB) 15 are not operated.

On the other hand, if the actual yaw rate Yrea is smaller than the target yaw rate Ytrg, then the control amount calculating unit 108 calculates the difference ΔY obtained by subtracting the actual yaw rate Yrea from the target yaw rate Ytrg, and the control amount calculating unit 108 individually determines the control of the electric power steering (EPS) 14 and the electronically controlled brake (ECB) 15 depending on the difference ΔY. FIG. 4 shows the control of the electric power steering (EPS) 14 and the electronically controlled brake (ECB) 15 depending on the difference ΔY obtained by subtracting the actual yaw rate from the target yaw rate, as performed by the driving support apparatus. As shown in FIG. 4, the control amount calculating unit 108 selects any one of three ways as described below as the control of the electric power steering (EPS) 14 and the electronically controlled brake (ECB) 15 depending on the magnitude of the difference ΔY at three levels, i.e., large, middle, and small. If the difference ΔY is small, the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. If the difference ΔY is middle or intermediate, the driving support apparatus simultaneously performs the steering of the vehicle and the deceleration of the vehicle. That is, the control amount calculating unit 108 determines the control of the respective components so that the control timing of the electric power steering (EPS) 15 is conformed to that of the electronically controlled brake (ECB) 15. If the difference $\Delta Y$ is large, the vehicle may become unstable if the steering of the vehicle and the deceleration of the vehicle are performed simultaneously. Therefore, the driving support apparatus performs the steering of the vehicle after previously decelerating the vehicle. That is, the control amount calculating unit 108 determines the control of the respective components so that the control timing of the electronically controlled brake (ECB) 15 is provided earlier than the control timing of the electric power steering (EPS) 14. It is appropriate that the relationship between the difference $\Delta Y$ and the control amount of the steering torque and the relationship between the difference $\Delta Y$ and the control amount of the braking hydraulic pressure are previously mapped. If the target yaw rate Ytrg is smaller than a preset value (maximum value of the yaw rate at which the avoidance of the departure from the traveling lane can be achieved by only the steering), the braking hydraulic pressure of the electronically controlled brake (ECB) 15 may be set to zero. The control amount calculating unit 108 operates the electric power steering (EPS) 14 and the electronically controlled brake (ECB) 15 in accordance with the control determined as described above and the control amounts calculated as described above.

In this way, the driving support apparatus performs the control of the electric power steering (EPS) 14 and the electronically controlled brake (ECB) 15, and thus it is possible to perform the support for the driving in order to avoid the departure from the traveling lane by means of any one of the three combinations of the deceleration of the vehicle and the steering of the vehicle depending on any one of the three levels of the magnitude of the difference $\Delta Y$ if the actual yaw rate Yrea is smaller than the target yaw rate Ytrg. Accordingly, it is possible to harmonize the steering of the vehicle and the deceleration of the vehicle when the support is performed so that the vehicle is allowed to travel in the traveling lane, and it is possible to allow the vehicle to travel stably.

(Control Amount Calculation Control Routine 1)

Figure 5:
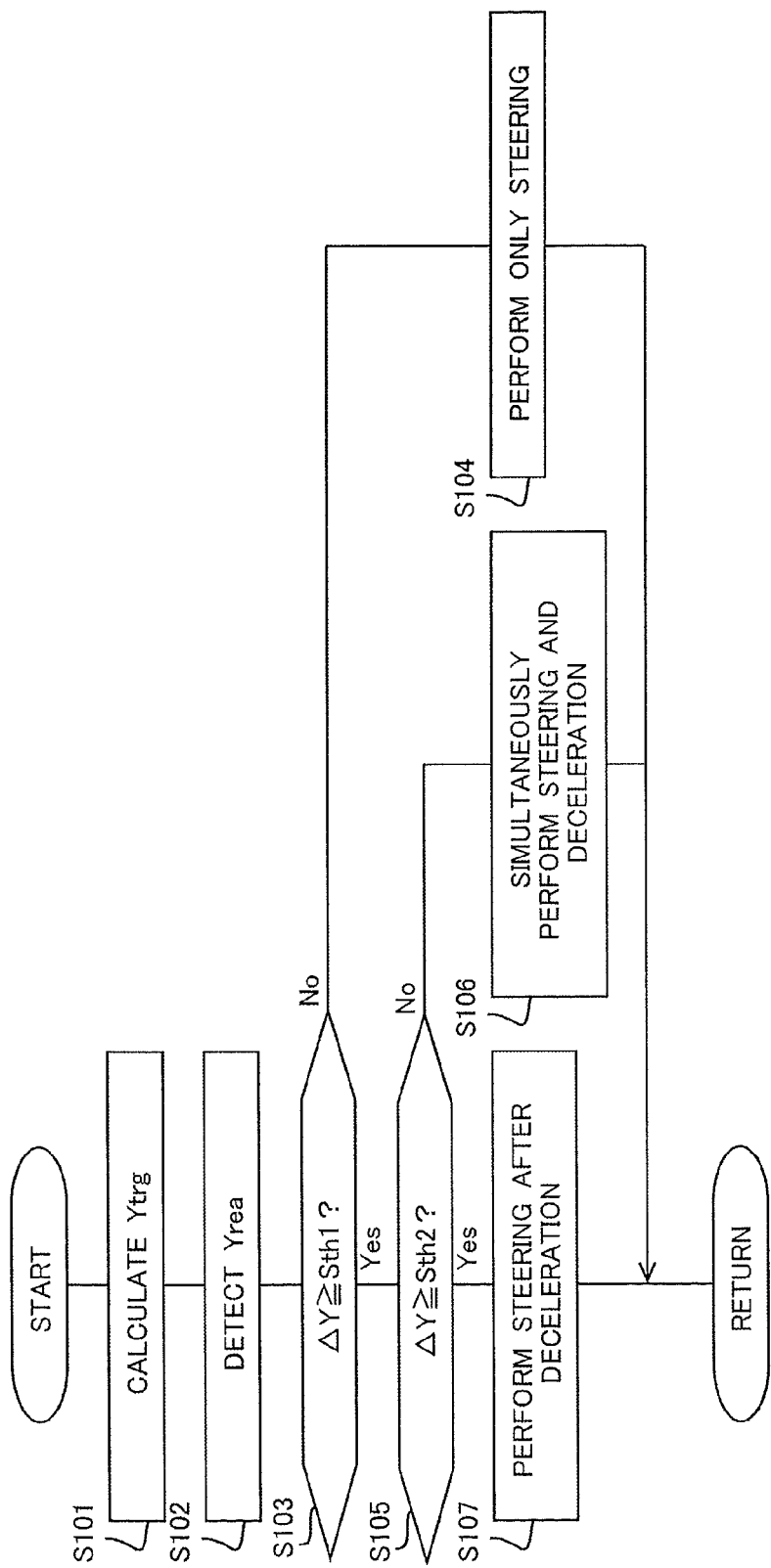
FIG. 5 shows a flow chart illustrating the control amount calculation control routine 1 according to the first embodiment.

An explanation will be made on the basis of a flow chart shown in FIG. 5 about the control amount calculation control routine 1 executed by the control amount calculating unit 108. FIG. 5 shows the flow chart illustrating the control amount calculation control routine 1. This routine is repeatedly executed by the control amount calculating unit 108 of ECU 1 every time when a predetermined period of time elapses.

When the routine shown in FIG. 5 is started, the control amount calculating unit 108 calculates the target yaw rate Ytrg in S101. In S102, the control amount calculating unit 108 detects the actual yaw rate Yrea.

In S103, the control amount calculating unit 108 determines whether or not the difference $\Delta Y$, which is obtained by subtracting the actual yaw rate Yrea from the target yaw rate Ytrg, is not less than a first threshold value Sth1. The first threshold value Sth1 is such a threshold value that the magnitude of the difference $\Delta Y$ is classified into "small" and others to change the control of the electric power steering (EPS) 14 and the electronically controlled brake (ECB) 15, and the first threshold value Sth1 is previously determined, for example, by an experiment or verification. The first threshold value Sth1 may be more decreased as the vehicle velocity is faster. The first threshold value Sth1 may be more decreased as the lane width is narrower. The first threshold value Sth1 may be decreased when any obstacle is present in the avoidance direction. If it is negatively determined in S103 that the difference $\Delta Y$ is smaller than the first threshold value Sth1, the control amount calculating unit 108 proceeds to S104. If it is affirmatively determined in S103 that the difference $\Delta Y$ is not less than the first threshold value Sth1, the control amount calculating unit 108 proceeds to S105.

In S104, the difference $\Delta Y$ is small in this situation, and hence the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. Further, the control amount calculating unit 108 calculates the control amount from the map of the relationship between the difference $\Delta Y$ and the control amount of the steering torque to control the electric power steering (EPS) 14 and the electronically controlled brake (ECB) 15 in accordance with the calculated control amount.

In S105, the control amount calculating unit 108 determines whether or not the difference $\Delta Y$, which is obtained by subtracting the actual yaw rate Yrea from the target yaw rate Ytrg, is not less than a second threshold value Sth2. The second threshold value Sth2 is such a threshold value that the magnitude of the difference $\Delta Y$ is classified into "middle" and "large" to change the control of the electric power steering (EPS) 14 and the electronically controlled brake (ECB) 15, and the second threshold value Sth2 is previously determined, for example, by an experiment or verification. The second threshold value Sth2 may be more decreased as the vehicle velocity is faster. The second threshold value Sth2 may be more decreased as the lane width is narrower. The second threshold value Sth2 may be decreased when any obstacle is present in the avoidance direction. If it is negatively determined in S105 that the difference $\Delta Y$ is smaller than the second threshold value Sth2, the control amount calculating unit 108 proceeds to S106. If it is affirmatively determined in S105 that the difference $\Delta Y$ is not less than the second threshold value Sth2, the control amount calculating unit 108 proceeds to S107.

In S106, the difference $\Delta Y$ is middle or intermediate in this situation, and hence the driving support apparatus simultaneously performs the steering of the vehicle and the deceleration of the vehicle. That is, the control amount calculating unit 108 determines the control of the respective components so that the control timing of the electric power steering (EPS) 14 is conformed to that of the electronically controlled brake (ECB) 15. Further, the control amount calculating unit 108 calculates the control amounts of the respective components from the map of the relationship between the difference $\Delta Y$ and the control amount of the steering torque and the map of the relationship between the difference $\Delta Y$ and the control amount of the braking hydraulic pressure to control the electric power steering (EPS) 14 and the electronically controlled brake (ECB) 15 in accordance with the calculated control amounts.

In S107, the difference $\Delta Y$ is large in this situation, and hence the vehicle may become unstable if the steering of the vehicle and the deceleration of the vehicle are simultaneously performed. Therefore, in order to avoid such a circumstance, the driving support apparatus performs the steering of the vehicle after previously decelerating the vehicle. That is, the control amount calculating unit 108 determines the control of the respective components so that the control timing of the electronically controlled brake (ECB) 15 comes earlier than the control timing of the electric power steering (EPS) 14. Further, the control amount calculating unit 108 calculates the control amounts of the respective components from the map of the relationship between the difference ΔY and the control amount of the steering torque and the map of the relationship between the difference ΔY and the control amount of the braking hydraulic pressure to control the electric power steering (EPS) 14 and the electronically controlled brake (ECB) 15 in accordance with the calculated control amounts.

The control amount calculating unit 108 executes the process shown in the foregoing flow chart, and thus the driving support apparatus can perform the support in order to avoid the departure from the traveling lane by means of any one of the three combinations of the deceleration of the vehicle and the steering of the vehicle depending on any one of the three levels of the magnitude of the difference ΔY between the target yaw rate and the actual yaw rate.

<Second Embodiment>

The first embodiment described above is illustrative of such an exemplary case that the steering of the vehicle and the deceleration of the vehicle are controlled individually when the support is performed so that the vehicle is allowed to travel in the traveling lane depending on the difference ΔY if the actual yaw rate Yrea is smaller than the target yaw rate Ytrg as provided in order that that the vehicle does not travel beyond the traveling lane. However, the present invention is not limited thereto. The steering of the vehicle and the deceleration of the vehicle may be controlled individually when the support is performed so that the vehicle is allowed to travel in the traveling lane depending on a difference ΔG between a target lateral acceleration Gtrg and an actual lateral acceleration Grea if the actual lateral acceleration Grea is smaller than the target lateral acceleration Gtrg as provided in order that the vehicle does not travel beyond the traveling lane. In this embodiment, an explanation will be made about the control based on the lateral acceleration as described above. The matters or items, which have been explained in the first embodiment described above, are omitted from the explanation. In this way, the parameter, which indicates the lateral movement, may be the lateral acceleration as used in this embodiment, or any other parameter in addition to the yaw rate.

(Control Amount Calculation Control)

An explanation will be made in detail below about the function of the control amount calculating unit 108 according to this embodiment.

If the operation request for operating the electric power steering (EPS) 14 and/or the electronically controlled brake (ECB) 15 is generated by the control determination unit 107, then the control amount calculating unit 108 calculates the control amounts of the electric power steering (EPS) 14 and the electronically controlled brake (ECB) 15, and the control amount calculating unit 108 operates the electric power steering (EPS) 14 and the electronically controlled brake (ECB) 15 in accordance with the calculated control amounts. In this procedure, when the control amounts of the electric power steering (EPS) 14 and the electronically controlled brake (ECB) 15 are calculated, the control amount calculating unit 108 firstly calculates the target lateral acceleration required to avoid the departure from the traveling lane by using, as the parameters, the information generated by the integrated recognition processing unit 104, the output signal of the wheel velocity sensor 6 (vehicle velocity), and the output signal of the lateral acceleration sensor 5b (lateral acceleration).

In particular, as shown in FIG. 3, the control amount calculating unit 108 calculates the target lateral acceleration Gtrg in accordance with the following expression assuming that D represents the relative distance from the traveling lane boundary, V represents the velocity of the vehicle (vehicle velocity), θ represents the yaw angle of the vehicle with respect to the traveling lane boundary, and T represents the collision allowance time. FIG. 3 conceptually shows a situation as assumed to calculate the target lateral acceleration.

$$T = D/V \sin\theta$$

$$Gtrg = V \sin\theta / T$$

$$\therefore Gtrg = (V \sin\theta \cdot V \sin\theta)/D$$

The control amount calculating unit 108 determines the control amount (steering torque) of the electric power steering (EPS) 14 and the control amount (braking hydraulic pressure) of the electronically controlled brake (ECB) 15 by using the target lateral acceleration Gtrg as the parameter (argument). In this procedure, the control amount calculating unit 108 detects the actual lateral acceleration Grea from the lateral acceleration sensor 5b, and the control amount calculating unit 108 determines whether or not the actual lateral acceleration Grea is smaller than the target lateral acceleration Gtrg. If the actual lateral acceleration Grea is larger than the target lateral acceleration Gtrg, then the driver operates the vehicle to such an extent that the target lateral acceleration Gtrg is exceeded, and hence the control amount calculating unit 108 determines that the control amount is zero so that the electric power steering (EPS) 14 and the electronically controlled brake (ECB) 15 are not operated.

On the other hand, if the actual lateral acceleration Grea is smaller than the target lateral acceleration Gtrg, then the control amount calculating unit 108 calculates the difference ΔG obtained by subtracting the actual lateral acceleration Grea from the target lateral acceleration Gtrg, and the control amount calculating unit 108 individually determines the control of the electric power steering (EPS) 14 and the electronically controlled brake (ECB) 15 depending on the difference ΔG. FIG. 6 shows the control of the electric power steering (EPS) 14 and the electronically controlled brake (ECB) 15 depending on the difference ΔG obtained by subtracting the actual lateral acceleration from the target lateral acceleration, as performed by the driving support apparatus. As shown in FIG. 6, the control amount calculating unit 108 selects any one of three ways as described below as the control of the electric power steering (EPS) 14 and the electronically controlled brake (ECB) 15 depending on the magnitude of the difference ΔG at three levels, i.e., large, middle, and small. If the difference ΔG is small, the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. If the difference ΔG is middle or intermediate, the driving support apparatus simultaneously performs the steering of the vehicle and the deceleration of the vehicle. That is, the control amount calculating unit 108 determines the control of the respective components so that the control timing of the electric power steering (EPS) 15 is conformed to that of the electronically controlled brake (ECB) 15. If the difference ΔG is large, the vehicle may become unstable if the steering of the vehicle and the deceleration of the vehicle are performed simultaneously. Therefore, the driving support apparatus performs the steering of the vehicle after previously decelerating the vehicle. That is, the control amount calculating unit 108 determines the control of the respective components so that the control timing of the electronically controlled brake (ECB) 15 is provided earlier than the control timing of the electric power steering (EPS) 14. It is appropriate that the relationship between the difference ΔG and the control amount of the steering torque and the relationship between the difference ΔG and the control amount of the braking hydraulic pressure are previously mapped. If the target lateral acceleration Gtrg is smaller than a preset value (maximum value of the lateral acceleration at which the avoidance of the departure from the traveling lane can be achieved by only the steering), the braking hydraulic pressure of the electronically controlled brake (ECB) 15 may be set to zero. The control amount calculating unit 108 operates the electric power steering (EPS) 14 and the electronically controlled brake (ECB) 15 in accordance with the control determined as described above and the control amounts calculated as described above.

In this way, the driving support apparatus performs the control of the electric power steering (EPS) 14 and the electronically controlled brake (ECB) 15, and thus it is possible to perform the support for the driving in order to avoid the departure from the traveling lane by means of any one of the three combinations of the deceleration of the vehicle and the steering of the vehicle depending on any one of the three levels of the magnitude of the difference ΔG if the actual lateral acceleration Grea is smaller than the target lateral acceleration Gtrg. Accordingly, it is possible to harmonize the steering of the vehicle and the deceleration of the vehicle when the support is performed so that the vehicle is allowed to travel in the traveling lane, and it is possible to allow the vehicle to travel stably.

(Control Amount Calculation Control Routine 2)

Figure 7:
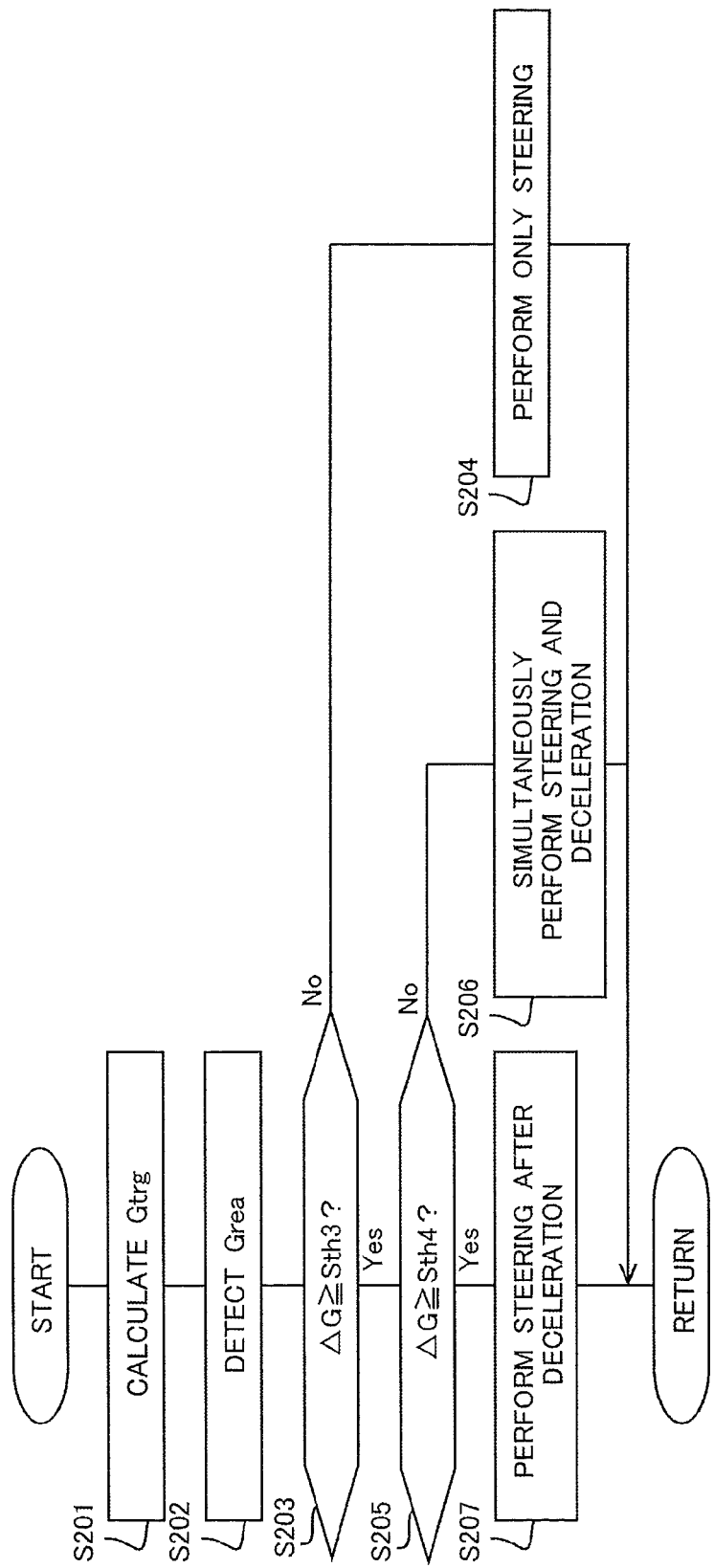
FIG. 7 shows a flow chart illustrating the control amount calculation control routine 2 according to the second embodiment.

An explanation will be made on the basis of a flow chart shown in FIG. 7 about the control amount calculation control routine 2 executed by the control amount calculating unit 108. FIG. 7 shows the flow chart illustrating the control amount calculation control routine 2. This routine is repeatedly executed by the control amount calculating unit 108 of ECU 1 every time when a predetermined period of time elapses.

When the routine shown in FIG. 7 is started, the control amount calculating unit 108 calculates the target lateral acceleration Gtrg in S201. In S202, the control amount calculating unit 108 detects the actual lateral acceleration Grea.

In S203, the control amount calculating unit 108 determines whether or not the difference ΔG, which is obtained by subtracting the actual lateral acceleration Grea from the target lateral acceleration Gtrg, is not less than a third threshold value Sth3. The third threshold value Sth3 is such a threshold value that the magnitude of the difference ΔG is classified into "small" and others to change the control of the electric power steering (EPS) 14 and the electronically controlled brake (ECB) 15, and the third threshold value Sth3 is previously determined, for example, by an experiment or verification. The third threshold value Sth3 may be more decreased as the vehicle velocity is faster. The third threshold value Sth3 may be more decreased as the lane width is narrower. The third threshold value Sth3 may be decreased when any obstacle is present in the avoidance direction. If it is negatively determined in S203 that the difference ΔG is smaller than the third threshold value Sth3, the control amount calculating unit 108 proceeds to S204. If it is affirmatively determined in S203 that the difference ΔG is not less than the third threshold value Sth3, the control amount calculating unit 108 proceeds to S205.

In S204, the difference ΔG is small in this situation, and hence the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. Further, the control amount calculating unit 108 calculates the control amount from the map of the relationship between the difference ΔG and the control amount of the steering torque to control the electric power steering (EPS) 14 and the electronically controlled brake (ECB) 15 in accordance with the calculated control amount.

In S205, the control amount calculating unit 108 determines whether or not the difference ΔG, which is obtained by subtracting the actual lateral acceleration Grea from the target lateral acceleration Gtrg, is not less than a fourth threshold value Sth4. The fourth threshold value Sth4 is such a threshold value that the magnitude of the difference ΔG is classified into "middle" and "large" to change the control of the electric power steering (EPS) 14 and the electronically controlled brake (ECB) 15, and the fourth threshold value Sth4 is previously determined, for example, by an experiment or verification. The fourth threshold value Sth4 may be more decreased as the vehicle velocity is faster. The fourth threshold value Sth4 may be more decreased as the lane width is narrower. The fourth threshold value Sth4 may be decreased when any obstacle is present in the avoidance direction. If it is negatively determined in S205 that the difference ΔG is smaller than the fourth threshold value Sth4, the control amount calculating unit 108 proceeds to S206. If it is affirmatively determined in S205 that the difference ΔG is not less than the fourth threshold value Sth4, the control amount calculating unit 108 proceeds to S207.

In S206, the difference ΔG is middle or intermediate in this situation, and hence the driving support apparatus simultaneously performs the steering of the vehicle and the deceleration of the vehicle. That is, the control amount calculating unit 108 determines the control of the respective components so that the control timing of the electric power steering (EPS) 14 is conformed to that of the electronically controlled brake (ECB) 15. Further, the control amount calculating unit 108 calculates the control amounts of the respective components from the map of the relationship between the difference ΔG and the control amount of the steering torque and the map of the relationship between the difference ΔG and the control amount of the braking hydraulic pressure to control the electric power steering (EPS) 14 and the electronically controlled brake (ECB) 15 in accordance with the calculated control amounts.

In S207, the difference ΔG is large in this situation, and hence the vehicle may become unstable if the steering of the vehicle and the deceleration of the vehicle are simultaneously performed. Therefore, in order to avoid such a circumstance, the driving support apparatus performs the steering of the vehicle after previously decelerating the vehicle. That is, the control amount calculating unit 108 determines the control of the respective components so that the control timing of the electronically controlled brake (ECB) 15 comes earlier than the control timing of the electric power steering (EPS) 14. Further, the control amount calculating unit 108 calculates the control amounts of the respective components from the map of the relationship between the difference ΔG and the control amount of the steering torque and the map of the relationship between the difference ΔG and the control amount of the braking hydraulic pressure to control the electric power steering (EPS) 14 and the electronically controlled brake (ECB) 15 in accordance with the calculated control amounts.

The process shown in the foregoing flow chart is executed, and thus it is possible to perform the support in order to avoid the departure from the traveling lane by means of any one of the three combinations of the deceleration of the vehicle and the steering of the vehicle depending on any one of the three levels of the magnitude of the difference ΔG between the target lateral acceleration and the actual lateral acceleration.

<Third Embodiment>

The second embodiment described above is illustrative of such an exemplary case that the steering of the vehicle and the deceleration of the vehicle are controlled individually when the support is performed so that the vehicle is allowed to travel in the traveling lane depending on the difference ΔG if the actual lateral acceleration Grea is smaller than the target lateral acceleration Gtrg as provided in order that that the vehicle does not travel beyond the traveling lane. However, it is also allowable to adopt any method other than those described in the first and second embodiments described above. The steering of the vehicle and the deceleration of the vehicle may be controlled individually when the support is performed so that the vehicle is allowed to travel in the traveling lane depending on a yaw angle θ between the vehicle and the traveling lane boundary. In this embodiment, an explanation will be made about the control based on the yaw angle θ as described above. The matters or items, which have been explained in the first and second embodiments described above, are omitted from the explanation.

(Control Amount Calculation Control)

An explanation will be made in detail below about the function of the control amount calculating unit 108 according to this embodiment.

If the operation request for operating the electric power steering (EPS) 14 and/or the electronically controlled brake (ECB) 15 is generated by the control determination unit 107, then the control amount calculating unit 108 calculates the control amounts of the electric power steering (EPS) 14 and the electronically controlled brake (ECB) 15, and the control amount calculating unit 108 operates the electric power steering (EPS) 14 and the electronically controlled brake (ECB) 15 in accordance with the calculated control amounts. In this procedure, when the control amounts of the electric power steering (EPS) 14 and the electronically controlled brake (ECB) 15 are calculated, the control amount calculating unit 108 firstly calculates the yaw angle θ of the vehicle with respect to the traveling lane boundary required to avoid the departure from the traveling lane by using, as the parameters, for example, the information generated by the integrated recognition processing unit 104. It is also allowable that the yaw angle θ is previously determined by the integrated recognition processing unit 104.

The control amount calculating unit 108 determines the control amount (steering torque) of the electric power steering (EPS) 14 and the control amount (braking hydraulic pressure) of the electronically controlled brake (ECB) 15 by using the yaw angle θ as the parameter (argument).

The control amount calculating unit 108 calculates the yaw angle θ, and the control amount calculating unit 108 individually determines the control of the electric power steering (EPS) 14 and the electronically controlled brake (ECB) 15 depending on the yaw angle θ. FIG. 8 shows the control of the electric power steering (EPS) 14 and the electronically controlled brake (ECB) 15 depending on the yaw angle θ, as performed by the driving support apparatus. As shown in FIG. 8, the control amount calculating unit 108 selects any one of three ways as described below as the control of the electric power steering (EPS) 14 and the electronically controlled brake (ECB) 15 depending on the magnitude of the yaw angle θ at three levels, i.e., large, middle, and small. If the yaw angle θ is small, the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. If the yaw angle θ is middle or intermediate, the driving support apparatus simultaneously performs the steering of the vehicle and the deceleration of the vehicle. That is, the control amount calculating unit 108 determines the control of the respective components so that the control timing of the electric power steering (EPS) 15 is conformed to that of the electronically controlled brake (ECB) 15. If the yaw angle θ is large, the vehicle may become unstable if the steering of the vehicle and the deceleration of the vehicle are performed simultaneously. Therefore, the driving support apparatus performs the steering of the vehicle after previously decelerating the vehicle. That is, the control amount calculating unit 108 determines the control of the respective components so that the control timing of the electronically controlled brake (ECB) 15 is provided earlier than the control timing of the electric power steering (EPS) 14. It is appropriate that the relationship between the yaw angle θ and the control amount of the steering torque and the relationship between the yaw angle θ and the control amount of the braking hydraulic pressure are previously mapped. If the yaw angle θ is smaller than a preset value (maximum value of the yaw angle θ at which the avoidance of the departure from the traveling lane can be achieved by only the steering), the braking hydraulic pressure of the electronically controlled brake (ECB) 15 may be set to zero. The control amount calculating unit 108 operates the electric power steering (EPS) 14 and the electronically controlled brake (ECB) 15 in accordance with the control determined as described above and the control amounts calculated as described above.

In this way, the driving support apparatus performs the control of the electric power steering (EPS) 14 and the electronically controlled brake (ECB) 15, and thus it is possible to perform the support for the driving in order to avoid the departure from the traveling lane by means of any one of the three combinations of the deceleration of the vehicle and the steering of the vehicle depending on any one of the three levels of the magnitude of the yaw angle θ. Accordingly, it is possible to harmonize the steering of the vehicle and the deceleration of the vehicle when the support is performed so that the vehicle is allowed to travel in the traveling lane, and it is possible to allow the vehicle to travel stably.

(Control Amount Calculation Control Routine 3)

Figure 9:
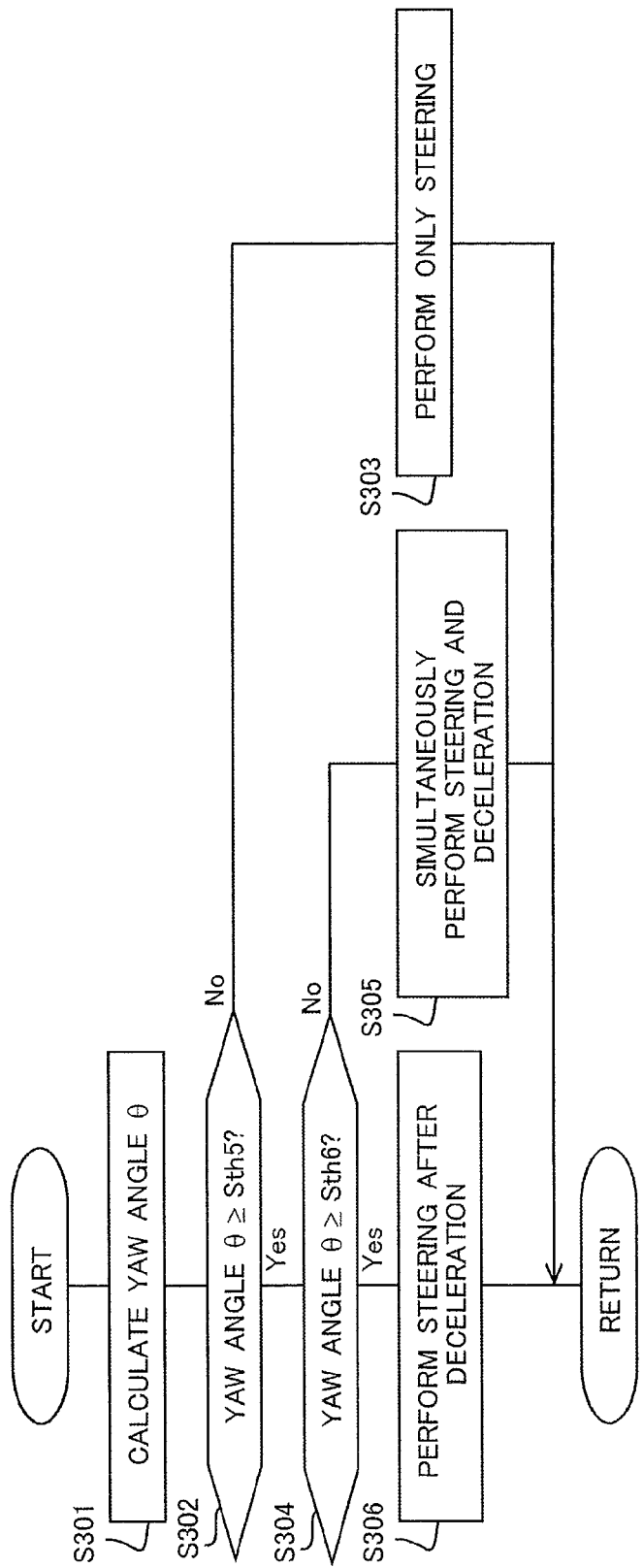
FIG. 9 shows a flow chart illustrating the control amount calculation control routine 3 according to the third embodiment.

An explanation will be made on the basis of a flow chart shown in FIG. 9 about the control amount calculation control routine 3 executed by the control amount calculating unit 108. FIG. 9 shows the flow chart illustrating the control amount calculation control routine 3. This routine is repeatedly executed by the control amount calculating unit 108 of ECU 1 every time when a predetermined period of time elapses.

When the routine shown in FIG. 9 is started, the control amount calculating unit 108 calculates the yaw angle $\theta$ in S301. Alternatively, the yaw angle $\theta$ may be previously determined by the integrated recognition processing unit 104.

In S302, the control amount calculating unit 108 determines whether or not the yaw angle $\theta$ is not less than a fifth threshold value Sth5. The fifth threshold value Sth5 is such a threshold value that the magnitude of the yaw angle $\theta$ is classified into "small" and others to change the control of the electric power steering (EPS) 14 and the electronically controlled brake (ECB) 15, and the fifth threshold value Sth5 is previously determined, for example, by an experiment or verification. The fifth threshold value Sth5 may be more decreased as the vehicle velocity is faster. The fifth threshold value Sth5 may be more decreased as the lane width is narrower. The fifth threshold value Sth5 may be decreased when any obstacle is present in the avoidance direction. If it is negatively determined in S302 that the yaw angle $\theta$ is smaller than the fifth threshold value Sth5, the control amount calculating unit 108 proceeds to S303. If it is affirmatively determined in S302 that the yaw angle $\theta$ is not less than the fifth threshold value Sth5, the control amount calculating unit 108 proceeds to S304.

In S303, the yaw angle $\theta$ is small in this situation, and hence the avoidance of the departure from the traveling lane can be achieved by only the support for the steering. Therefore, the driving support apparatus performs only the steering of the vehicle without performing the deceleration of the vehicle. That is, the control amount calculating unit 108 determines the control of the respective components so that the electronically controlled brake (ECB) 15 is not operated and the electric power steering (EPS) 14 is operated. Further, the control amount calculating unit 108 calculates the control amount from the map of the relationship between the yaw angle $\theta$ and the control amount of the steering torque to control the electric power steering (EPS) 14 and the electronically controlled brake (ECB) 15 in accordance with the calculated control amount.

In S304, the control amount calculating unit 108 determines whether or not the yaw angle $\theta$ is not less than a sixth threshold value Sth6. The sixth threshold value Sth6 is such a threshold value that the magnitude of the yaw angle $\theta$ is classified into "middle" and "large" to change the control of the electric power steering (EPS) 14 and the electronically controlled brake (ECB) 15, and the sixth threshold value Sth6 is previously determined, for example, by an experiment or verification. The sixth threshold value Sth6 may be more decreased as the vehicle velocity is faster. The sixth threshold value Sth6 may be more decreased as the lane width is narrower. The sixth threshold value Sth6 may be decreased when any obstacle is present in the avoidance direction. If it is negatively determined in S304 that the yaw angle $\theta$ is smaller than the sixth threshold value Sth6, the control amount calculating unit 108 proceeds to S305. If it is affirmatively determined in S304 that the yaw angle $\theta$ is not less than the sixth threshold value Sth6, the control amount calculating unit 108 proceeds to S306.

In S305, the yaw angle $\theta$ is middle or intermediate in this situation, and hence the driving support apparatus simultaneously performs the steering of the vehicle and the deceleration of the vehicle. That is, the control amount calculating unit 108 determines the control of the respective components so that the control timing of the electric power steering (EPS) 14 is conformed to that of the electronically controlled brake (ECB) 15. Further, the control amount calculating unit 108 calculates the control amounts of the respective components from the map of the relationship between the yaw angle $\theta$ and the control amount of the steering torque and the map of the relationship between the yaw angle $\theta$ and the control amount of the braking hydraulic pressure to control the electric power steering (EPS) 14 and the electronically controlled brake (ECB) 15 in accordance with the calculated control amounts.

In S306, the yaw angle $\theta$ is large in this situation, and hence the vehicle may become unstable if the steering of the vehicle and the deceleration of the vehicle are simultaneously performed. Therefore, in order to avoid such a circumstance, the driving support apparatus performs the steering of the vehicle after previously decelerating the vehicle. That is, the control amount calculating unit 108 determines the control of the respective components so that the control timing of the electronically controlled brake (ECB) 15 comes earlier than the control timing of the electric power steering (EPS) 14. Further, the control amount calculating unit 108 calculates the control amounts of the respective components from the map of the relationship between the yaw angle $\theta$ and the control amount of the steering torque and the map of the relationship between the yaw angle $\theta$ and the control amount of the braking hydraulic pressure to control the electric power steering (EPS) 14 and the electronically controlled brake (ECB) 15 in accordance with the calculated control amounts.

The process shown in the foregoing flow chart is executed, and thus it is possible to perform the support in order to avoid the departure from the traveling lane by means of any one of the three combinations of the deceleration of the vehicle and the steering of the vehicle depending on any one of the three levels of the magnitude of the yaw angle $\theta$.

(Other Things)

The driving support apparatus according to the present invention is not limited to the embodiments described above. It is also allowable to apply various changes within a scope or range without deviating from the gist or essential characteristics of the present invention. Further, the embodiments described above are also embodiments of the driving support method without being limited to only the driving support apparatus.

REFERENCE SIGNS LIST

1: ECU, 2: radar device, 3: vehicle exterior camera, 4: driver camera, 5a: yaw rate sensor, 5b: lateral acceleration sensor, 6: wheel velocity sensor, 7: brake sensor, 8: accelerator sensor, 9: winker switch, 10: steering angle sensor, 11: steering torque sensor, 12: buzzer, 13: display device, 14: electric power steering (EPS), 15: electronically controlled brake (ECB), 100: obstacle information processing unit, 101: lane information processing unit, 102: consciousness lowering determination unit, 103: driver intention determination unit, 104: integrated recognition processing unit, 105:

common support determination unit, 106: alarm determination unit, 107: control determination unit, 108: control amount calculating unit.

The invention claimed is:

1. A driving support apparatus for setting a traveling lane in which a vehicle can travel on the basis of a road marking to indicate a lane boundary or a traveling-prohibited region and performing support by combining steering wheel control of the vehicle and deceleration of the vehicle so that the vehicle is allowed to travel in the traveling lane when the vehicle is to be departed from the traveling lane, the driving support apparatus comprising an electronic control unit (ECU) configured to perform
so that the vehicle is allowed to travel in the traveling lane based on an output from at least any one of a yaw rate sensor, a lateral acceleration sensor, and a wheel velocity sensor,
the ECU is further configured to:
calculate a required value indicating lateral movement required to avoid departure of the vehicle from the traveling lane;
when the calculated required value is smaller than a first threshold value, perform only the steering wheel control of the vehicle as the support for the driving in order to avoid the departure from the traveling lane without performing the deceleration of the vehicle;
when the obtained required value is not less than the first threshold value and smaller than a second threshold value, the second threshold value being set as a lower limit of the required value where simultaneous control of a speed and a steering wheel of the vehicle causes the vehicle to be unstable, perform the steering wheel control of the vehicle as the support for the driving in order to avoid the departure from the traveling lane and the deceleration of the vehicle simultaneously; and
when the obtained required value is not less than the second threshold value, perform the steering wheel control of the vehicle as the support for the driving in order to avoid the departure from the traveling lane after decelerating the vehicle.

2. A driving support apparatus for setting a traveling lane in which a vehicle can travel on the basis of a road marking to indicate a lane boundary or a traveling prohibited region and performing support by combining steering wheel control of the vehicle and deceleration of the vehicle so that the vehicle is allowed to travel in the traveling lane when the vehicle is to be departed from the traveling lane, the driving support apparatus comprising an electronic control unit (ECU) configured to perform the support
so that the vehicle is allowed to travel in the traveling lane based on an output from at least any one of a yaw rate sensor, a lateral acceleration sensor, and a wheel velocity sensor,
the ECU is further configured to:
obtain an angle between the vehicle's traveling direction and the boundary of the traveling lane;
when the obtained angle is smaller than a first threshold value, perform only the steering wheel control of the vehicle as the support for the driving in order to avoid the departure from the traveling lane without performing the deceleration of the vehicle;
when the obtained angle is not less than the first threshold value and smaller than a second threshold value, the second threshold value being set as a lower limit of the angle between the vehicle's traveling direction and the boundary of the traveling lane where simultaneous control of a speed and a steering wheel of the vehicle causes the vehicle to be unstable, perform the steering wheel control of the vehicle as the support for the driving in order to avoid the departure from the traveling lane and the deceleration of the vehicle simultaneously; and
when the obtained angle is not less than the second threshold value, perform the steering wheel control of the vehicle as the support for driving in order to avoid the departure from the traveling lane after decelerating the vehicle.

3. A driving support method comprising:
a step of setting a traveling lane in which a vehicle can travel on the basis of a road marking to indicate a lane boundary or a traveling-prohibited region; and
a step of performing support by combining steering of the vehicle and deceleration of the vehicle so that the vehicle is allowed to travel in the traveling lane when the vehicle is to be departed from the traveling lane, wherein
when the support is performed so that the vehicle is allowed to travel in the traveling lane based on an output from at least any one of a yaw rate sensor, a lateral acceleration sensor, and a wheel velocity sensor,
when an actual value is smaller than a target value of a parameter which indicates lateral movement in order to avoid departure of the vehicle from the traveling lane and the difference between the target value and the actual value is smaller than a first threshold value, only the steering wheel control of the vehicle as the support for the driving in order to avoid the departure from the traveling lane is performed without performing the deceleration of the vehicle;
when the difference between the target value and the actual value is not less than the first threshold value and smaller than a second threshold value, the second threshold value being set as a lower limit of the difference between the target value and the actual value where simultaneous control of a speed and a steering wheel of the vehicle causes the vehicle to be unstable, the steering wheel control of the vehicle as the support for the driving in order to avoid the departure from the traveling lane and the deceleration of the vehicle are performed simultaneously; and
when the difference between the target value and the actual value is not less than the second threshold value, the steering wheel control of the vehicle as the support for the driving in order to avoid the departure from the traveling lane is performed after previously decelerating the vehicle.

4. A driving support method comprising:
a step of setting a traveling lane in which a vehicle can travel on the basis of a road marking to indicate a lane boundary or a traveling prohibited region; and
a step of performing support by combining steering wheel control of the vehicle and deceleration of the vehicle so that the vehicle is allowed to travel in the traveling lane when the vehicle is to be departed from the traveling lane, wherein:
when the support is performed so that the vehicle is allowed to travel in the traveling lane based on an output from at least any one of a yaw rate sensor, a lateral acceleration sensor, and a wheel velocity sensor,
when an angle between the vehicle's traveling direction and the boundary of the traveling lane is smaller than a first threshold value, only the steering wheel control of the vehicle as the support for the driving in order to avoid the departure from the traveling lane is performed without performing the deceleration of the vehicle;

when an angle between the vehicle's traveling direction and the boundary of the traveling lane is not less than the first threshold value and smaller than a second threshold value, the second threshold value being set as a lower limit of the angle between the vehicle's traveling direction and the boundary of the traveling lane where simultaneous control of a speed and a steering wheel of the vehicle causes the vehicle to be unstable, the steering wheel control of the vehicle as the support for the driving in order to avoid the departure from the traveling lane and the deceleration of the vehicle are performed simultaneously; and when an angle between the vehicle's traveling direction and the boundary of the traveling lane is not less than the second threshold value, perform the steering wheel control of the vehicle as the support for the driving in order to avoid the departure from the traveling lane after decelerating the vehicle.

\* \* \* \* \*